US 8,296,513 B1

(12) United States Patent
Liu

(10) Patent No.: US 8,296,513 B1
(45) Date of Patent: Oct. 23, 2012

(54) STANDBY DISK SPIN UP CONTROL IN DISK ARRAY SYSTEM USING EXPANDER DEVICE

(75) Inventor: Jun Liu, Shanghai (CN)

(73) Assignee: PMC-Sierra, Inc., Santa Clara, CA (US)

( * ) Notice: Subject to any disclaimer, the term of this patent is extended or adjusted under 35 U.S.C. 154(b) by 567 days.

(21) Appl. No.: 12/545,114

(22) Filed: Aug. 21, 2009

(51) Int. Cl.
 G06F 13/28 (2006.01)
 G06F 13/00 (2006.01)
 G06F 9/26 (2006.01)
 G06F 9/34 (2006.01)
 G11B 15/18 (2006.01)

(52) U.S. Cl. . 711/112; 711/202; 711/203; 711/E12.061; 360/69

(58) Field of Classification Search .................. None
 See application file for complete search history.

(56) References Cited

U.S. PATENT DOCUMENTS

| 7,474,926 | B1 | 1/2009 | Carr et al. | |
|---|---|---|---|---|
| 2004/0153263 | A1 | 8/2004 | Holle | |
| 2004/0243761 | A1 | 12/2004 | Bohrer et al. | |
| 2006/0294269 | A1* | 12/2006 | Duerk et al. | 710/62 |
| 2009/0150643 | A1* | 6/2009 | Jones et al. | 711/203 |

OTHER PUBLICATIONS

Rob Elliott, Serial Attached SCSI Technical Overview, Revision 1, May 6, 2002.*
Seagate Product Manual, Seagate Cuda 7200pm.pdf; Sep. 2005.
http://copansystems.com//products/power_managed/raid.php, "Power Managed RAID Software," at least as early as May 8, 2008.
HDS makes Bold Move into MAID Storage, Beth Pariseau, Sep. 2007.
http://www.byteandswitch.com/document.asp?doc_id=139176 &WT.svl=news2_1; "EMC Sets Out 2008 Roadmap—Vendor talks green computing, SMBs, and its first foray into consumer storage," at least as early as May 8, 2008.

* cited by examiner

*Primary Examiner* — Kevin Verbrugge
*Assistant Examiner* — Eric S Cardwell
(74) *Attorney, Agent, or Firm* — Dennis R. Haszko

(57) ABSTRACT

A method and system are provided for controlling SAS/SATA disk spin up when a disk enters an inactive mode, such as standby mode, in a near line storage system. A routing table entry is modified for a selected hard disk drive in an expander routing table to redirect and reroute to a spinup control virtual target any access requests intended for the selected hard disk drive, in response to the selected hard disk drive being in standby mode. In response to the selected hard disk drive exiting standby mode, the routing table entry is modified to direct and route requests for access to the selected hard disk drive back to the drive itself. A SAS expander device can control spin up for standby disk drives in a disk array. Alternatively, spin up control can be performed for disks in other power modes, such as idle, in a disk array.

26 Claims, 6 Drawing Sheets

| Routed SAS Address | PHY number |
|---|---|
| SAS disk SAS address 1 | 4 |
| SAS disk SAS address 2 | 5 |
| SAS disk SAS address 3 | 6 |
| SAS disk SAS address 4 | 7 |

FIG. 4A

| Routed SAS Address | PHY number |
|---|---|
| SAS disk SAS address 1 | 4 |
| SAS disk SAS address 2 | 37 |
| SAS disk SAS address 3 | 37 |
| SAS disk SAS address 4 | 7 |

FIG. 4B

STANDBY DISK SPIN UP CONTROL IN DISK ARRAY SYSTEM USING EXPANDER DEVICE

FIELD

The present application relates generally to hard disk drives, or hard disks. More particularly, the present application relates to spinup control in an array of hard disks.

BACKGROUND

A hard disk consumes a lot of power when it spins up. The initial power surge is due to the crowbar current of the hard disk motor that spins the internal platter. This crowbar current can be as large as 10 times the normal operating current used to maintain the platter spinning, move the read/write head and power the control electronics. The length of time the hard disk drive spins up and the amount of additional power consumed is vendor specific. Table 1 below shows power consumption data for a particular SATA disk drive (Seagate ST3160021A), as an example.

TABLE 1

| Power Dissipation (Watts) | Average (watts, 25° C.) | 5 V typ amps | 12 V typ amps |
|---|---|---|---|
| Spinup | — | — | 2.8 (peak) |
| Idle | 7.5 | 0.482 | 0.424 |
| Idle* (with offline activity) | 9.3 | 0.587 | 0.530 |
| Operating 40% r/w, 40% seek, 20% inop. | 12.0 | 0.638 | 0.739 |
| Seeking | 12.5 | 0.412 | 0.870 |
| Standby | 0.900 | 0.144 | 0.015 |
| Sleep | 0.900 | 0.144 | 0.015 |

In order to reduce the maximum current demand on the power supply and enable use of lower-cost power supply designs, staggered spin-up is designed to sequentially spin up disk drives upon enclosure power up. This is important, as power supplies are a significant cost when implementing arrays of hard disks. If the power supply were sized to handle simultaneous crowbar current of all the hard disks in the array, it would only be stressed during the initial power-on event. By reducing the power supply capability to handle the nominal power requirements with some margin to handle a small number of crowbar currents, the system cost is greatly reduced.

For a SAS (Serial Attached SCSI)/SATA (Serial ATA) disk array, expander devices are part of a service delivery subsystem and facilitate communication between multiple SAS devices. The SAS hard disk normally does not spin up its platter until a NOTIFY (ENABLE SPINUP) is received. SAS initiator devices and expander devices send NOTIFY (ENABLE SPINUP) while attached to a SAS device. The expander transmits one NOTIFY (ENABLE SPINUP) after power on when the enclosure is ready for initial spin-up.

SAS expanders control the spin-up of SATA devices in a different fashion, as SATA devices do not contain a power condition state machine similar to SAS. The only method to prevent the spin-up of a SATA device is to not successfully complete speed negotiation of the physical link. That is, the speed negotiation does not progress past the COMWAKE event of the normal SATA speed negotiation sequence. The SATA drive is in SATA SPINUP HOLD state. Normally, the spin-up of SATA disks is permitted by a host within the SAS topology by the SAS management protocol (SMP) target within the SAS expander. Specifically, a host uses the expander SMP control to reset the serial link connected to the SATA drive to allow speed negotiation to complete. At this point, the SATA drive exits the SATA HOLD state and starts to spin-up the drive.

Expander firmware provides staggered spin up control for both SAS and SATA drives at booting up stage. However, the above method cannot be used to control the potential simultaneous disk spin up when the multiple STANDBY disks accept I/O requests from a host at the same time slot. A disk is not in STANDBY mode before initial boot up or power up. A disk can be put in STANDBY mode by firmware or software to save power.

A disk in STANDBY mode will start to spin up once it receives an access command. If there are multiple disks in standby mode and they are accessed simultaneously, a spin up issue arises which will overload the system power supply if there is no mechanism available to deal with this. The condition would become even more serious due to the trend of density and green (energy saving) requests for a storage system.

If there are multiple disks in standby mode and they are accessed simultaneously later in a disk array system, spin up issues arise which will overload the system power supply. There are two methods to put the disks into STANDBY mode and bring them out of that mode.

A first method is a system software approach involving a host system which is external to the disk array. There can be many hosts that share the same disk array. Host system software detects disk activities by a host driver and puts a disk into STANDBY mode by issuing a SCSI START STOP UNIT command to SAS drives, or an ATA STANDBY IMMEDIATE command to SATA disks. When there are READ/WRITE requests needed to be issued to hard drive, the host system software needs to coordinate the access sequence and perform the spin up control.

However, there are many drawbacks with this method.

a. In this approach, the system software needs to know many details about the disk array system. For example, software needs to understand how many drives are allowed to spin up simultaneously, which drive is in which enclosures, etc. This approach works in a DAS (Direct Attached Storage) environment as storage is directly attached to the host, however is not suitable for a SAN (Storage Area Network) environment.

b. The drawback above can also cause an interoperability issue when there are multi-vendor disk arrays. In a data center, there can be storage systems from various vendors. With virtualization technology, some storage subsystems can even be connected to a virtualized engine from another vendor.

c. This method cannot work reliably in a SAN environment, which would normally involve multiple disk arrays, multiple hosts, multiple RAID heads, or many disk arrays without a RAID head, etc.

d. Things would become worse when there are disk drives that need to be hot plugged when STANDBY disks begin to spin up, as spin up of hot plugged disks is controlled by expander firmware, not by host software.

Existing approaches do not address the problem of disk spin up after STANDBY mode in a disk array by expander device. Moreover, such known approaches use resources that are external to the disk array enclosure, thus requiring detailed knowledge of the system.

It is, therefore, desirable to provide a disk spin up control approach that can be implemented within a disk array enclosure.

BRIEF DESCRIPTION OF THE DRAWINGS

Embodiments of the present application will now be described, by way of example only, with reference to the attached Figures, wherein:

FIG. 4A illustrates exemplary contents of an expander routing table.

FIG. 4B illustrates the expander routing table of FIG. 4A after modification according to an embodiment of the present application.

DETAILED DESCRIPTION

Figure 1:
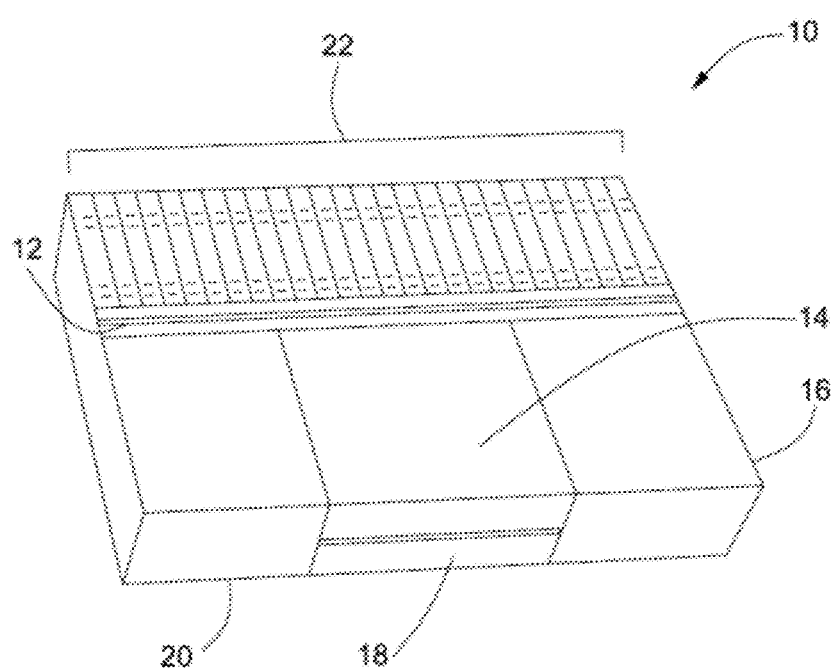
FIG. 1 illustrates an example of a disk array.

Generally, the present application provides a method and system for controlling SAS/SATA disk spin up when a disk enters an inactive mode, such as standby mode, in a near line storage system. A routing table entry is modified for a selected hard disk drive in an expander routing table to redirect and reroute to a spinup control virtual target any access requests intended for the selected hard disk drive, in response to the selected hard disk drive being in standby mode. In response to the selected hard disk drive exiting standby mode, the routing table entry is modified to direct and route requests for access to the selected hard disk drive back to the drive itself. A SAS expander device can control spin up, or perform spin up control, for standby disk drives in a disk array. Alternatively, spin up control can be performed for disks in other power modes, such as idle, in a disk array.

In an embodiment, there is provided a method of spin-up control in an array of SAS/SATA hard disk drives including an expander, including the following steps: modifying a routing table entry for a selected hard disk drive in an expander routing table to redirect to a spinup control virtual target any access requests intended for the selected hard disk drive, in response to the selected hard disk drive being in inactive mode; routing to the spinup control virtual target an access request intended for the selected hard disk drive; and in response to the selected hard disk drive exiting inactive mode, further modifying the routing table entry to direct requests for access to the selected hard disk drive.

The selected hard disk drive can be in standby mode, or in idle mode. Modifying the routing table entry can include replacing a PHY address for the selected hard disk drive with a virtual PHY address associated with the virtual target. The PHY address for the selected hard disk drive can include a destination port address and wherein the virtual PHY address comprises an expander virtual port address.

Further modifying the routing table entry can include replacing the virtual PHY address associated with the virtual target with the PHY address for the selected hard disk drive. The PHY address for the selected hard disk drive can include a destination port address and wherein the virtual PHY address comprises an expander virtual port address.

The method can further include sending a spinup control message back to a requesting device from which the access request intended for the selected hard disk drive originated. The method can further include, in response to a positive determination of permission from an expander virtual target policy, forwarding the access request to the selected hard disk drive and initiating spinup of the selected hard disk drive.

In another embodiment, there is provided a computer readable memory storing statements and instructions for execution by a processor to perform a method of spin-up control in an array of SAS/SATA hard disk drives including an expander, the method including the steps as described above and herein.

In a further embodiment, there is provided a system for spin-up control in an array of SAS/SATA hard disk drives. The system includes an expander, the expander including a SAS/SATA disk array spinup control system. The spinup control system includes a disk activity detector arranged to detect disk activity in the disk array, an idle time counter arranged to count idle time in co-operation with the disk activity detector, a spinup control virtual target addressable by a virtual port, a routing table, and an expander spinup manager. The expander spinup manager is in communication with the disk activity detector and the idle time counter, and arranged to modify the routing table so that a request to access a selected hard disk drive in inactive mode is redirected to the spinup control virtual target. The expander spinup manager is also arranged to route to the spinup control virtual target the request to access the selected hard disk drive. The selected hard disk drive can be in standby mode or in idle mode.

The expander spinup manager can be arranged to, in response to the selected hard disk drive exiting inactive mode, further modifying the routing table entry to direct requests for access to the selected hard disk drive. The expander spinup manager can further be arranged to detect an idle condition and send a command to put a disk in standby mode in response to detection of the idle condition.

The idle time counter can be provided in SAS and SATA bridge link layer of each expander port to co-operate with the disk activity detector to count idle time. The system can further include a SAS/SATA port selector (SPS), the idle time counter and the disk activity detector being provided in the SPS, the idle time counter including a timer. The idle time counter can be provided as a timer in a serial tunneling protocol (STP) bridge in the expander device to count idle time.

The system can further include a computer readable memory, the routing table and/or the spinup control virtual target being stored on the computer readable memory.

Other aspects and features will become apparent to those ordinarily skilled in the art upon review of the following description of specific embodiments of the application in conjunction with the accompanying figures.

Embodiments of the present application provide a method that uses a SAS expander device to control spin up, or perform spin up control, for STANDBY disk drives in a disk array. This method is logical way to solve this issue. If an access request is received for a hard drive that is in standby mode, the request is routed to an expander virtual port, or phy. After determining that the policy permits forwarding, the request is forwarded and spinup is initiated.

This provides a better manageability and interoperability than system software approaches. With products from different vendors, synchronization between them is difficult or not possible. When the logic is brought down to the enclosure of the disk array, it is simplified. The controller is transparent to all of the clients.

In the present application, the term "inactive mode" will be used to represent any one of idle or standby disk power modes. Embodiments described herein address the spin up control for a disk in inactive mode, such as a STANDBY disk, in a SAS/SATA disk array. In other embodiments, spin up control is performed for disks in other power modes, such as IDLE, in a disk array. While many of the examples below refer to a disk in standby mode, they are also to be understood to refer to a disk in inactive mode.

FIG. 1 illustrates an example of a disk array 10. A typical disk array design comprises a midplane, an input output controller board (IOC) and redundant power supplies. The midplane module 12 distributes power and signals to all components in the enclosure. The example of FIG. 1 shows a first IOC 14 and an associated first power/cooling module 16, as well as a second IOC 18 and an associated second power/cooling module 20, which can provide redundancy. A number of hard disk drive modules, such as a set of 26 SAS/SATA HDDs, are provided in a disk module area 22 in communication with the midplane module 12. In the example in FIG. 1, the disk module area 22 is provided as a "drawer" that houses twenty-six 2.5" hard disk drives.

The primary component in the input output controller board 14 and 18 is an expander device (not shown in FIG. 1, but shown later in FIGS. 2 and 5). An expander device is used to expand the number of end devices that can be connected together. End devices include host bus adapters, RAID controllers, hard disk drives, and external disk drive enclosures. Enclosure management controller functions can be embedded in the card as well. For a SATA disk array, a SATA Port Selector device (SPS) may be used between expander device and SATA disk drive to provide redundant ports to a single ported SATA drive.

"Green storage" is an initiative in which enterprises aim to reduce the amount of power being consumed by their IT infrastructures. Making products more energy-efficient, or more green, has been a difficult requirement for vendors to meet. Hard drives normally provide programmable power management to provide greater energy efficiency. Below in Table 2 is the typical definition of each of a plurality of hard drive power modes.

TABLE 2

| Power Mode | Heads | Spindle | Buffer |
|---|---|---|---|
| Active | Tracking | Rotating | Enabled |
| Idle | Tracking | Rotating | Enabled |
| Standby | Parked | Stopped | Enabled |
| Sleep | Parked | Stopped | Disabled |

A drive is in Active mode during the read/write/seek operations. In Idle mode, the buffer remains enabled, and the drive accepts all commands and returns to Active mode any time disk access is necessary.

The drive enters Standby mode when it receives a Standby Immediate command. If a standby timer is set, the drive can also enter Standby mode automatically after the drive has been inactive for a specifiable length of time. The standby timer delay is established using a Standby or Idle command. In Standby mode, the drive buffer is enabled, the heads are parked and the spindle is at rest. The drive accepts all commands and returns to Active mode any time disk access is necessary.

The drive enters Sleep mode after receiving a Sleep command. In Sleep mode, the drive buffer is disabled, the heads are parked and the spindle is at rest. The drive leaves Sleep mode after it receives a Hard Reset or Soft Reset. After receiving a reset, the drive exits Sleep mode and enters Standby mode with all current translation parameters intact.

For near line storage applications such as archiving, backup, etc., disks can be put into an inactive mode, either IDLE or STANDBY mode, to save power when they are not used in a disk array. This type of system can sacrifice some performance for energy saving purposes. For first line storage, performance and online concurrent transactions that the system can support are more of a concern.

One known approach can power down disks (in standby mode) when they are not used. This service is an add-on licensing fee for the system priced per frame. Another known approach provides power-saving capabilities as a software upgrade for a disk array family. A further approach uses Massive Array of Idle Drives (MAID) technology, in which a proportion of drives in an array are shutdown in order to save power.

These approaches are all based on using system software or RAID controller software to detect disk activity and issue a command to bring a disk in/out of STANDBY/IDLE mode. Other approaches use hard disk spin control for various applications. In general, they rely on idle timeouts to spin-down the disk and some protocol command to spin-up the disk. They do not describe mechanisms to stagger the spin-up of the hard disks. The Serial Attached SCSI standard teaches the use of NOTIFIY primitives for spin-up as part of the SAS Expander function to handle primitive broadcast.

Commonly assigned U.S. Pat. No. 7,474,926 issued on Jan. 6, 2009 is directed to Hierarchical Device Spin-Up Control for Serial Attached Devices. It provides a simple in-band mechanism that controls the expanders within the topology to limit the total number of devices powering-up at any given time.

One difference with previous approaches is that in embodiments described herein, this mechanism is implemented in the expander. The expander in the enclosure knows information about the disk drives. The disk array is shared between various hosts and some RAID controllers. One controller can be provided for multiple disk arrays, or one disk array with multiple controllers.

The present application provides a logical way to perform spin up control in a disk enclosure itself, either at start up stage or when a disk enters STANDBY mode in an array, as it has complete information of the enclosures. Embodiment of the present application use both hardware and firmware components to control the entry and exit of STANDBY mode for disks, so as to solve the spin up issue when simultaneous access to STANDBY disks occurs. The enclosure hides details of the array design from the system software. With embodiments described herein, the system only needs to provide the related policy setting to the enclosure.

Figure 2:
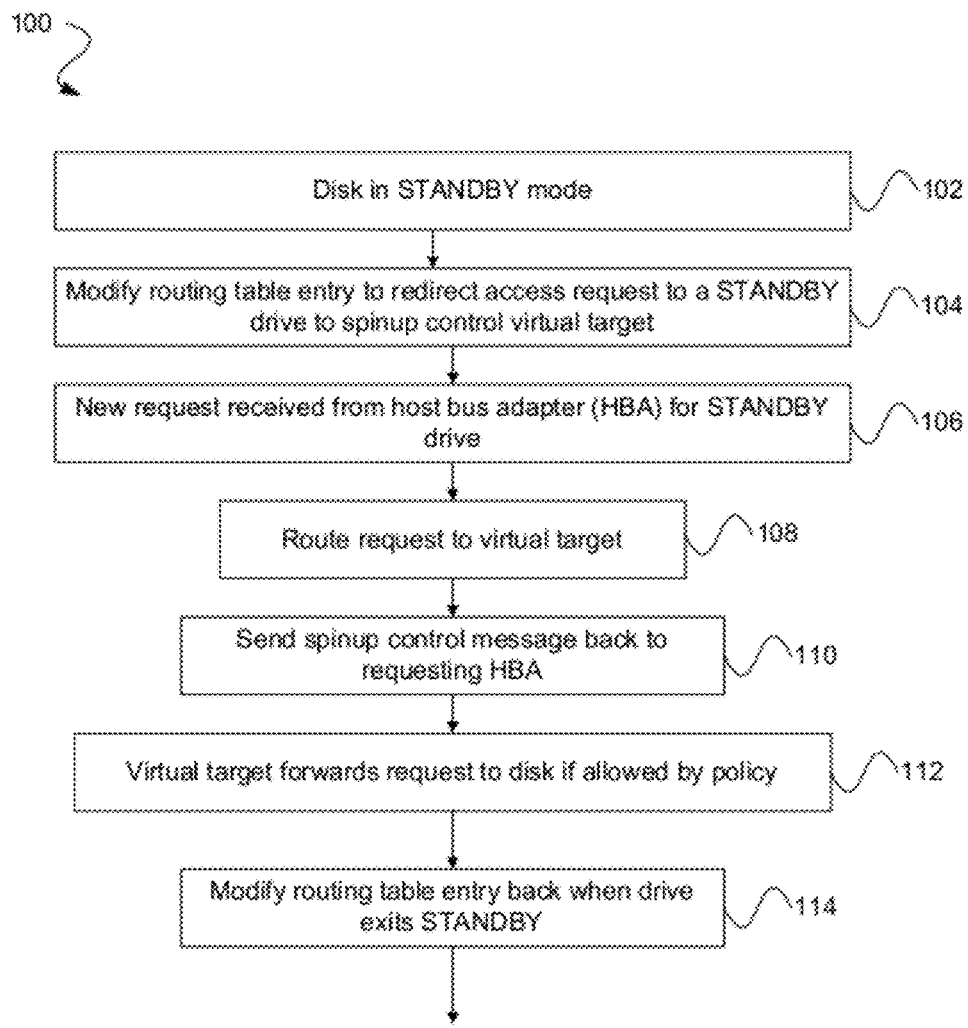
FIG. 2 illustrates a method for spinup control in a SATA disk array according to an embodiment of the present application.

FIG. 2 illustrates a method 100 for spinup control in a SATA disk array according to an embodiment of the present application. Step 102 indicates a starting point of the method, in which a selected disk drive is in inactive mode, such as standby mode in this example. A method according to an embodiment can include receiving a determination that the selected hard disk drive is in an inactive mode, or determining that the selected hard disk drive is in an inactive mode. In step 104, a routing table entry in an expander routing table is modified to redirect to a spinup control virtual target any access requests intended for the standby drive. For example, a PHY address for the standby drive is replaced with a virtual PHY associated with the virtual target.

In step 106, after routing table modification, a request for access to the standby drive is received from an end device, such as a host bus adapter (HBA). In step 108, the new access request is routed to the virtual target. In step 110, a spinup control message is sent back to the requesting HBA. In step 112, the virtual target forwards the request to the standby disk if allowed by the policy.

In step 114, in response to the selected disk drive exiting standby mode, the routing table entry is modified to direct requests for access to the selected disk. For example, the virtual PHY associated with the virtual target is replaced with the PHY address for the selected disk drive.

Figure 3:
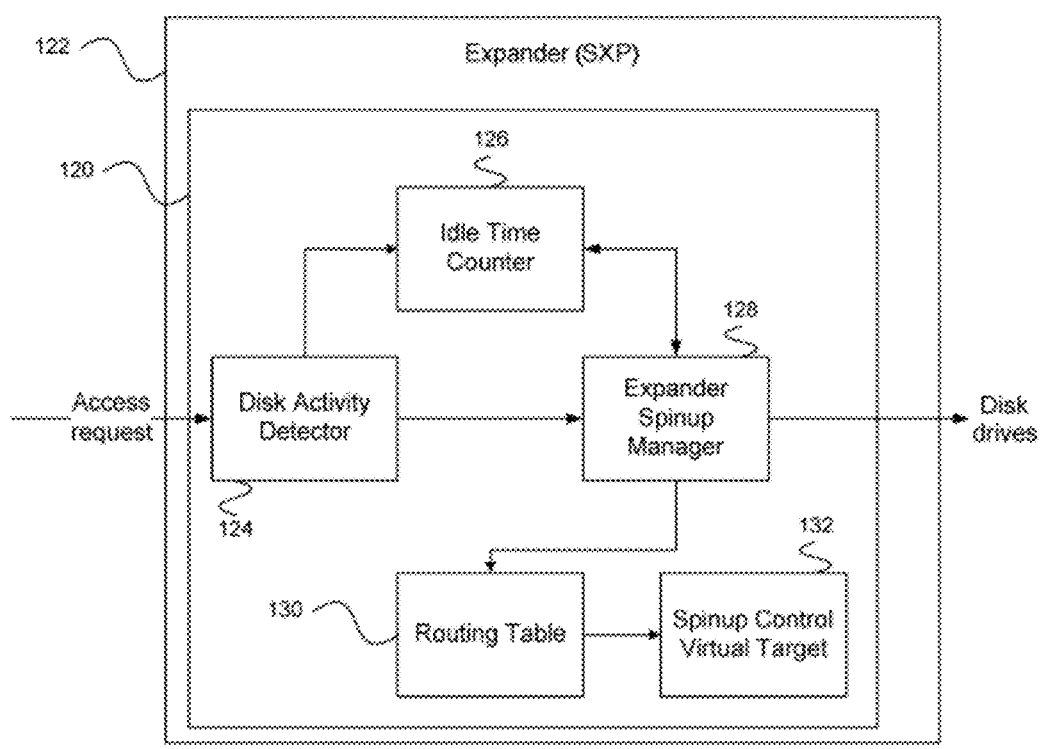
FIG. 3 illustrates a system for spinup control in a SATA disk array according to an embodiment of the present application.

FIG. 3 illustrates a system 120 for spinup control in a SATA disk array according to an embodiment of the present application. In an embodiment, the system 120 is provided within an expander 122 in a disk array. An expander virtual PHY and virtual SSP/STP target can be used to solve the disk spin up issue when in standby mode in a disk array. This provides a better manageability and interoperability than system software approaches. A disk array typically includes only 1 or 2 expanders. If there are 2 expanders and both have controllers, this can be approached either by: designating one as a master and the other as a slave; or providing the ability to synchronize between them, such as by providing a synchronization mechanism in each expander controller.

The SATA disk array spinup control system 120 includes a disk activity detector 124, which detects SAS/SATA disk activity in a SAS/SATA disk array. The disk activity detector 124 can be implemented in a number of different ways. In a first embodiment, an idle time counter 126, or timer, is added in SXL (SAS and SATA Bridge Link Layer) of each expander port to co-operate with an activity detector to count the IDLE time. If experiencing IDLE state for some pre-configured time, the SAS expander (SXP) 122 generates an interrupt.

In a second embodiment, a SPS (SAS/SATA Port Selector) can be used to detect idle activity period to SATA disk by adding a timer which co-operates with an activity detector in SPS. If experiencing idle activity for some pre-configured time, SPS can send this message out. In a third embodiment, a timer is added in STP Bridge in an expander device to count IDLE time.

If the non-interrupted IDLE time does not exceed pre-configured time and disk activity is detected, the time value is set to zero and start to re-count if IDLE state is detected again. The first embodiment is applicable to both SAS and SATA disks, the second and third embodiments are only applicable to SATA disks.

The three embodiments above can be described as providing a disk activity detector within an expander device, the disk activity detector arranged to detect disk activity in the disk array, which can also be described as detecting or counting idle time in the disk array. Embodiments of the present application provide an expander-specific disk activity detector.

A system according to an embodiment of the present application includes an expander spinup manager 128. The expander spinup manager 128 can be implemented as an expander spinup controller. In an embodiment, the expander spinup manager 128 can be implemented as SXP firmware. The expander spinup manager 128 is in communication with the disk activity detector 124. The disk activity detector 124 notifies the expander spinup manager 128 when a disk IDLE event is detected. The expander spinup manager 128 can detect whether this condition has existed for a threshold period of time. The threshold can be a pre-configured time set by a policy engine. After detection of the IDLE event, the expander spinup manager 128 then checks the IDLE time counter 126 again. If the value of the IDLE time counter 126 is larger than the previously reported value, the IDLE condition is confirmed. If IDLE condition is met, then the expander spinup manager 128 can send a command to put disks in STANDBY mode.

If there are multiple disks in STANDBY mode, a problem will arise in known systems when simultaneous access to those disks occurs. As mentioned earlier, in order to control the spin up process, the expander spinup manager 128 modifies a routing table 130 of the expander so that the destination ports for the STANDBY disks are redirected to a spinup control virtual target 132, which is addressable using a virtual port. The virtual target is in the expander device, and there is one virtual target per expander. The routing table entries with a destination port of a disk in STANDBY mode will be modified by the expander spinup manager 128. In an embodiment, the system includes a memory storing the routing table. A memory can also be provided to store the virtual phy address(es).

FIG. 4A illustrates exemplary contents of an expander routing table 130. The routing table shows PHY numbers 4, 5, 6 and 7 associated with SAS disk SAS addresses 1, 2, 3 and 4, respectively. Assume that both disks 2 and 3 go into STANDBY mode, and that the virtual PHY ID for the spinup control virtual target in this example is 37. FIG. 4B illustrates the expander routing table 130 of FIG. 4A after modification according to an embodiment of the present application. The PHY numbers 5 and 6 for both disks 2 and 3, which are in standby mode, are replaced with PHY ID 37 belonging to the spinup control virtual target.

The expander spinup manager 128 in FIG. 3 maintains a list of STANDBY disks in the enclosure. The expander spinup manager 128 redirects subsequent disk access requests to a virtual STP target or a virtual SCSI target in the expander device. The expander device manipulates the operation in the link layer. If an open frame is received to request a connection to a disk in standby mode, the virtual target's policy will determine whether to allow or reject the request. The virtual target in the expander modifies the routing table and modifies the request based on its stored policy.

If there are two expanders in the disk array, two virtual ports are preferably provided. The expander routing table may need to be modified for the two ports. If the host can access the disks, and if there are some zoning functionalities, then only one implementation in one expander can be sufficient. If there is no zoning protection, the functionality is preferably provided in both of the expanders. Therefore, while it is possible to only have to modify one routing table, in many instances both routing tables will have to be modified. The two routing tables interact with one another and synchronize with one another.

Embodiments of the present application include a spin up method to sequence the I/O request. The method can take into consideration a number of factors including, for example: the enclosure power supply capability, current powered disks, access request number, STANDBY disk number, etc.

In response to a determination that it is OK to send a command to disks, the virtual target modifies the routing table back and fakes/forwards the open frame to STANDBY disks. If a disk is not allowed to be accessed immediately, the virtual target will not forward the open frame to the specific STANDBY disk. Instead, the virtual target sends an OPEN_REJECT (RETRY) or AIP (Waiting on device) primitive to the initiator periodically within the duration of an open timeout timer (for example, 1 ms). In response to a determination that it is OK to forward the request to disks according to spin up algorithm, the firmware modifies the routing table accordingly and forwards the request to disk.

Figure 5:
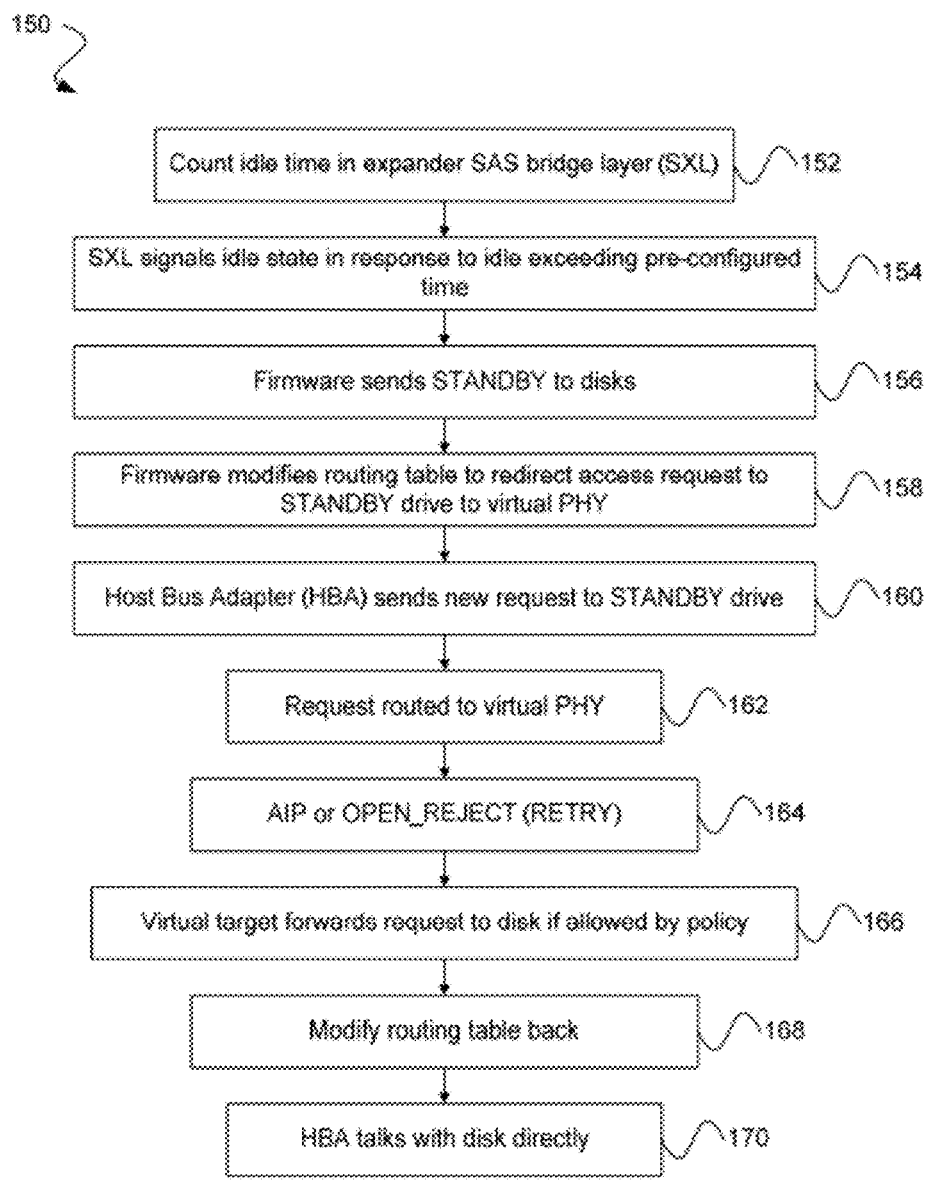
FIG. 5 is a flowchart illustrating a method of spin-up control in an array of hard drives including an expander according to an embodiment of the present application.

FIG. 5 is a flowchart illustrating a method 150 of spin-up control in an array of SAS/SATA hard drives including an expander according to an embodiment of the present application. These steps relate to a particular exemplary embodiment. In step 152, the SXL component counts the idle time when there are no SOF frames detected, and signals the firmware on this event in step 154 when the time value exceeds pre-configured time. Then in step 156, the firmware sends a standby initiation command, such as FLUSH CACHE and STANDBY IMMEDIATE command, to a SATA disk. In step 158, the firmware modifies the routing table to redirect to the virtual target in the expander device a request to access the STANDBY disk. In an embodiment, steps 156 and 158 are performed at the same time, or substantially simultaneously.

When a standby disk needs to be accessed by a host bus adapter (HBA), such as in response to a request sent in step 160, the request (open connection) is routed to the virtual target in step 162. In step 164, the virtual target forwards the request to the disk if allowed by the policy. For example, the virtual target can send an AIP primitive to the HBA within open timeout timer (1 ms) periodically and uses the spin up method, or algorithm, to determine whether or not to permit this request. When the disk exits standby mode, the routing table is modified back in step 168 and the HBA can talk with disks directly in step 170.

Figure 6:
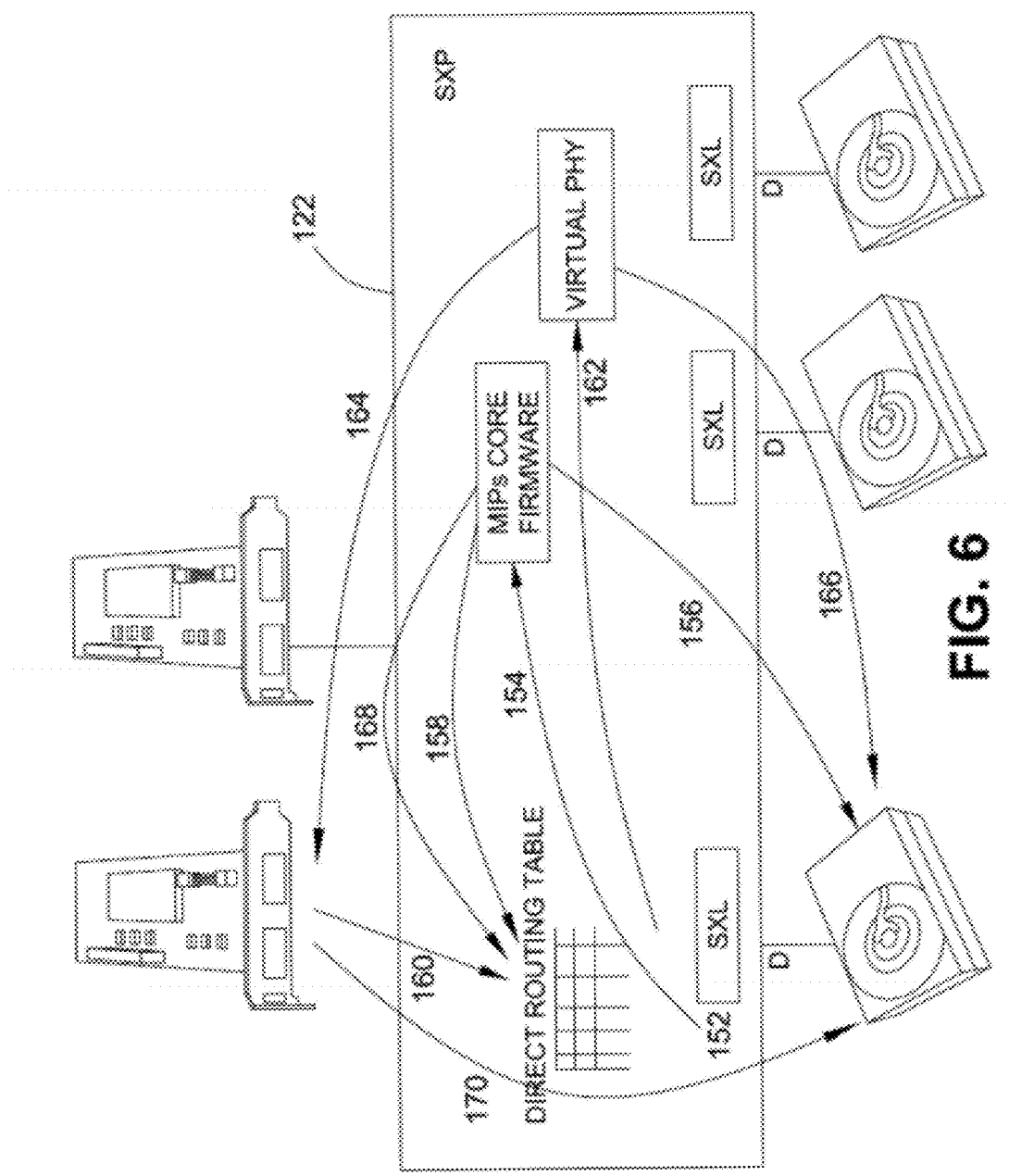
FIG. 6 illustrates an example of a spinup control system and method in a SATA disk array according to an embodiment of the present application.

FIG. 6 illustrates an example of a spinup control system and method in a SATA disk array according to an embodiment of the present application. The method steps 152-170 identified in relation to the flowchart of FIG. 5 are shown in conjunction with the exemplary block diagram embodiment of FIG. 6, to provide a further illustration of the embodiment in the form of a block and flow diagram.

Embodiments of the present application can be designed in Application Specific Standard Integrated Circuit Products (ASSPs) by PMC-Sierra, Inc. Exemplary products include SXP36X6G, SXP36X3G, SXP24X6G, SXP24X3G, SPS3GT, SPS6GT etc and related firmware components.

Embodiments of the present application can be used with current SPS3G and SXP6G/3G products. An "activity indicator" in SPS can be used as an IDLE state detector. Corresponding general purpose input output, GPIO, (Activity Visual Indicator) can be connected to expander device interruptible GPIO or Enclosure management controller interruptible GPIO to generate an interrupt when there is an activity. Firmware can count the idle time and clear it each time an activity interrupt comes in expander device or in the enclosure management controller. This way, an event can be generated to firmware when the idle timer exceeds a configured threshold. Then, the firmware can deal with this event accordingly.

Green storage requires reducing power consumption and heat generation in corporate data centers. STANDBY is a meaningful mode for disks to save power consumption when it is not used. If disks are put into STANDBY mode, the embodiments described herein provide a viable way to perform spin up control using both SXP firmware and hardware components.

While embodiments of the present application have been discussed in relation to spinup control, a brief discussion is now presented regarding the detection of idle condition and placing in standby mode. IDLE state is defined as the state in which there is no SATA FIS (Frame Information Sequence) or SAS frame in transit. If either a SOF (Start of Frame) primitive or a SATA_SOF primitive is detected, ACTIVITY state is identified.

SXP firmware can then issue a standby initiation command to put the disk(s) in STANDBY mode. The standby initiation command can be a SCSI command sent to a corresponding SAS disk, or an ATA command sent to a corresponding SATA disk. This is sent in response to detection of the confirmed IDLE condition after a pre-configured idle condition detection time, or threshold. A related SCSI command would be START STOP UNIT, and a related ATA command would be FLUSH CACHE and STANDBY IMMEDIATE. START STOP UNIT, etc commands are the commands to issue to put disk in STANDBY mode. In an embodiment, the pre-configured time set by the policy engine is a time that is sufficient to ensure the completion of a normal I/O transaction.

Embodiments of the present application can include a method to broadcast the event that a disk is entering STANDBY mode, so that host software can perform a corresponding policy modification. For example, a host may use a different I/O timeout value for a STANDBY disk than for an active disk. A time out value for a STANDBY disk is typically larger than the time out value allowed for an active disk. The BROADCAST primitive in the SAS specification can serve this purpose to notify a host of this ASYNCHRONOUS disk entering standby mode, or triggering a STANDBY event.

In the preceding description, for purposes of explanation, numerous details are set forth in order to provide a thorough understanding of the embodiments of the application. However, it will be apparent to one skilled in the art that these specific details are not required in order to practice the embodiments. In other instances, well-known electrical structures and circuits are shown in block diagram form in order not to obscure. For example, specific details are not provided as to whether the embodiments described herein are implemented as a software routine, hardware circuit, firmware, or a combination thereof.

Embodiments of the present application can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the present application. Those of ordinary skill in the art will appreciate that other instructions and operations necessary to implement the described embodiments can also be stored on the machine-readable medium. Software running from the machine-readable medium can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of spin-up control in an array of serial attached small computer serial interface (SAS)/serial advanced technology attachment (SATA) hard drives including an expander, comprising:

modifying a routing table entry for a selected hard disk drive in an expander routing table to redirect to a spinup control virtual target any access requests intended for the selected hard disk drive, in response to the selected hard disk drive being in inactive mode;

routing to the spinup control virtual target an access request intended for the selected hard disk drive;

in response to the selected hard disk drive exiting inactive mode, further modifying the routing table entry to direct requests for access to the selected hard disk drive; and in response to a positive determination of permission from an expander virtual target policy, forwarding the access request to the selected hard disk drive and initiating spinup of the selected hard disk drive.

2. The method of claim 1 wherein the selected hard disk drive is in standby mode.

3. The method of claim 1 wherein the selected hard disk drive is in idle mode.

4. The method of claim 1 wherein modifying the routing table entry comprises replacing a PHY address for the selected hard disk drive with a virtual PHY address associated with the virtual target.

5. The method of claim 4 wherein the PHY address for the selected hard disk drive comprises a destination port address and wherein the virtual PHY address comprises an expander virtual port address.

6. The method of claim 1 wherein further modifying the routing table entry comprises replacing the virtual PHY address associated with the virtual target with the PHY address for the selected hard disk drive.

7. The method of claim 6 wherein the PHY address for the selected hard disk drive comprises a destination port address and wherein the virtual PHY address comprises an expander virtual port address.

8. The method of claim 1 further comprising sending a spinup control message back to a requesting device from which the access request intended for the selected hard disk drive originated.

9. A system for spin-up control in an array of serial attached small computer serial interface (SAS)/serial advanced technology attachment (SATA) hard drives, comprising:
an expander, the expander including a SAS/SATA disk array spinup control system, the spinup control system including,
a disk activity detector arranged to detect disk activity in the disk array,
an idle time counter arranged to count idle time in co-operation with the disk activity detector,
a spinup control virtual target addressable by a virtual port, a routing table, and
an expander spinup manager, in communication with the disk activity detector and the idle time counter, and arranged to modify the routing table so that a request to access a selected hard disk drive in inactive mode is redirected to the spinup control virtual target, and arranged to route to the spinup control virtual target the request to access the selected hard disk drive, and arranged to, in response to a positive determination of permission from an expander virtual target policy, forward the access request to the selected hard disk drive and initiate spinup of the selected hard disk drive.

10. The system of claim 9 wherein the selected hard disk drive is in standby mode.

11. The system of claim 9 wherein the selected hard disk drive is in idle mode.

12. The system of claim 9 wherein the expander spinup manager is arranged to, in response to the selected hard disk drive exiting inactive mode, further modifying the routing table entry to direct requests for access to the selected hard disk drive.

13. The system of claim 9 wherein the expander spinup manager is arranged to detect an idle condition and send a command to put a disk in standby mode in response to detection of the idle condition.

14. The system of claim 9 wherein the idle time counter is provided in SAS and SATA bridge link layer of each expander port to co-operate with the disk activity detector to count idle time.

15. The system of claim 9 further comprising a SAS/SATA port selector (SPS), the idle time counter and the disk activity detector being provided in the SPS, the idle time counter including a timer.

16. The system of claim 9 wherein the idle time counter is provided as a timer in a serial tunneling protocol (STP) bridge in the expander device to count idle time.

17. The system of claim 9 further comprising a computer readable memory, the routing table being stored on the computer readable memory.

18. The system of claim 9 further comprising a computer readable memory, the spinup control virtual target being stored on the computer readable memory.

19. A computer readable memory storing statements and instructions for execution by a processor to perform a method of spin-up control in an array of serial attached small computer serial interface (SAS)/serial advanced technology attachment (SATA) hard drives including an expander, the method comprising:
modifying a routing table entry for a selected hard disk drive in an expander routing table to redirect to a spinup control virtual target any access requests intended for the selected hard disk drive, in response to the selected hard disk drive being in inactive mode;
routing to the spinup control virtual target an access request intended for the selected hard disk drive;
in response to the selected hard disk drive exiting inactive mode, further modifying the routing table entry to direct requests for access to the selected hard disk drive; and
in response to a positive determination of permission from an expander virtual target policy, forwarding the access request to the selected hard disk drive and initiating spinup of the selected hard disk drive.

20. The computer readable memory of claim 19 wherein the selected hard disk drive is in standby mode.

21. The computer readable memory of claim 19 wherein the selected hard disk drive is in idle mode.

22. The computer readable memory of claim 19 wherein modifying the routing table entry comprises replacing a PHY address for the selected hard disk drive with a virtual PHY address associated with the virtual target.

23. The computer readable memory of claim 22 wherein the PHY address for the selected hard disk drive comprises a destination port address and wherein the virtual PHY address comprises an expander virtual port address.

24. The computer readable memory of claim 19 wherein further modifying the routing table entry comprises replacing the virtual PHY address associated with the virtual target with the PHY address for the selected hard disk drive.

25. The computer readable memory of claim 24 wherein the PHY address for the selected hard disk drive comprises a destination port address and wherein the virtual PHY address comprises an expander virtual port address.

26. The computer readable memory of claim 19 wherein the method further comprises sending a spinup control message back to a requesting device from which the access request intended for the selected hard disk drive originated.

* * * * *